US012355131B2

(12) United States Patent
Mochizuki et al.

(10) Patent No.: US 12,355,131 B2
(45) Date of Patent: Jul. 8, 2025

(54) ANTENNA APPARATUS AND RADOME

(71) Applicant: NEC Corporation, Tokyo (JP)

(72) Inventors: Takuji Mochizuki, Tokyo (JP); Yoshihide Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 160 days.

(21) Appl. No.: 18/275,956

(22) PCT Filed: Nov. 10, 2021

(86) PCT No.: PCT/JP2021/041381
§ 371 (c)(1),
(2) Date: Aug. 4, 2023

(87) PCT Pub. No.: WO2022/176285
PCT Pub. Date: Aug. 25, 2022

(65) Prior Publication Data

US 2024/0120634 A1 Apr. 11, 2024

(30) Foreign Application Priority Data

Feb. 17, 2021 (JP) ................................ 2021-023028

(51) Int. Cl.
*H01Q 1/02* (2006.01)
*H01Q 1/42* (2006.01)

(52) U.S. Cl.
CPC ................ *H01Q 1/02* (2013.01); *H01Q 1/42* (2013.01)

(58) Field of Classification Search
CPC .......... H01Q 1/02; H01Q 1/246; H01Q 1/42; H01Q 21/064
See application file for complete search history.

(56) References Cited

U.S. PATENT DOCUMENTS

| | | | | |
|---|---|---|---|---|
| 2018/0358710 A1* | 12/2018 | Toyao | ................. | H01Q 15/148 |
| 2020/0021005 A1* | 1/2020 | Kosaka | .................... | H01Q 1/42 |
| 2021/0305667 A1 | 9/2021 | Bencivenni | | |

FOREIGN PATENT DOCUMENTS

| | | |
|---|---|---|
| EP | 3621146 A1 | 3/2020 |
| JP | 2012-175422 A | 9/2012 |
| WO | 2017/086377 A1 | 5/2017 |
| WO | 2018/168699 A1 | 9/2018 |

OTHER PUBLICATIONS

International Search Report for PCT Application No. PCT/JP2021/041381, mailed on Jan. 25, 2022.

* cited by examiner

*Primary Examiner* — Hoang V Nguyen
(74) *Attorney, Agent, or Firm* — Sughrue Mion, PLLC

(57) ABSTRACT

To provide an antenna apparatus and a radome that are capable of suppressing an increase in size of the antenna apparatus, an antenna apparatus (100) includes a substrate (10) in which a plurality of antenna elements (20) are disposed on a first surface, and a radome (50) having thermal conductivity, which covers the substrate (10) and forms a plurality of slots (53) at positions facing each of the plurality of antenna elements (20). The radome (50) includes a heat radiation fin (56) protruding to an opposite side to the first surface side, and a wall portion (52) being provided between an antenna element (20) and an antenna element (20) being adjacent to the antenna element (20), and being capable of transferring heat of a heat generating component (40) connected to the substrate (10) to the heat radiation fin (56).

16 Claims, 8 Drawing Sheets

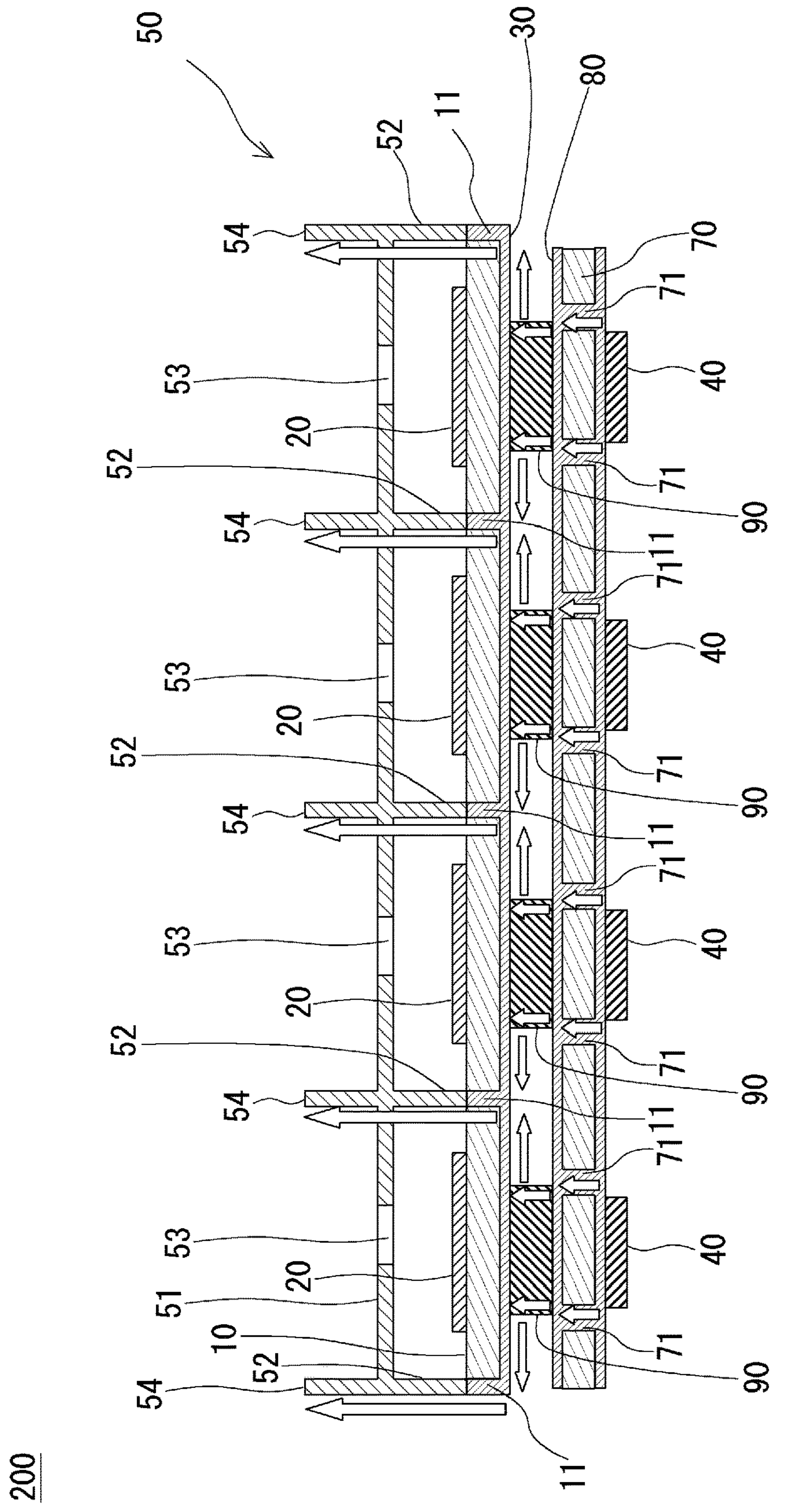
Fig. 8
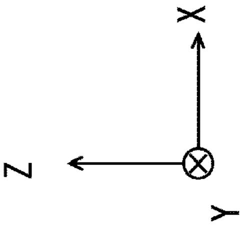

ANTENNA APPARATUS AND RADOME

This application is a National Stage Entry of PCT/JP2021/041381 filed on Nov. 10, 2021, which claims priority from JP Patent Application 2021-023028 filed on Feb. 17, 2021, the contents of all of which are incorporated herein by reference, in their entirety.

TECHNICAL FIELD

The present disclosure relates to an antenna apparatus and a radome.

BACKGROUND ART

In an antenna-integrated base station apparatus, a resin radome is used in order to protect an antenna surface of an antenna. When a resin radome is used, the radome becomes thicker in order to enhance durability and the like. Therefore, as in Patent Literature 1, it has been studied to protect an antenna surface by a housing made of a conductor without using a resin radome.

CITATION LIST

Patent Literature

[Patent Literature 1] Japanese Unexamined Patent Application Publication No. 2012-175422

SUMMARY OF INVENTION

Technical Problem

Incidentally, in recent years, with increase in capacity of communication, an antenna apparatus including a larger number of antenna elements than the antenna apparatus disclosed in Patent Literature 1 has been studied. In an antenna apparatus including a large number of antenna elements, a large number of transceivers are provided associated to the large number of antenna elements, thus it tends to increase a size of the antenna apparatus. Therefore, it is required to suppress an increase in size of the antenna apparatus.

One object of the present disclosure has been made in order to solve the problem described above, and is to provide an antenna apparatus and a radome that are capable of suppressing an increase in size of an antenna apparatus.

Solution to Problem

An antenna apparatus according to the present disclosure includes:

- a first substrate configured to dispose a plurality of antenna elements on a first surface; and
- a radome configured to cover the first substrate, form a plurality of slots at positions facing each of the plurality of antenna elements, and have thermal conductivity, wherein the radome includes

- a heat radiation fin configured to protrude to an opposite side to the first surface side, and
- a wall portion configured to be provided between a first antenna element and a second antenna element being adjacent to the first antenna element among the plurality of antenna elements, and be capable of transferring heat of a heat generating component connected to the first substrate to the heat radiation fin.

A radome according to the present disclosure has thermal conductivity, and includes:

- a planar portion configured to form a plurality of slots at positions facing each of a plurality of antenna elements and include a heat radiation fin protruding to an opposite side to a first surface side, in a state of covering a first substrate of which the plurality of antenna elements are disposed on the first surface; and
- a wall portion configured to be provided between a first antenna element and a second antenna element being adjacent to the first antenna element among the plurality of antenna elements, and be capable of transferring heat of a heat generating component connected to the first substrate to the heat radiation fin.

Advantageous Effects of Invention

According to the present disclosure, it is possible to provide an antenna apparatus and a radome that are capable of suppressing an increase in size of an antenna apparatus.

BRIEF DESCRIPTION OF DRAWINGS

FIG. 8 is a diagram for describing a flow of heat radiation in the antenna apparatus according to the second example embodiment.

EXAMPLE EMBODIMENT

Figure 1:
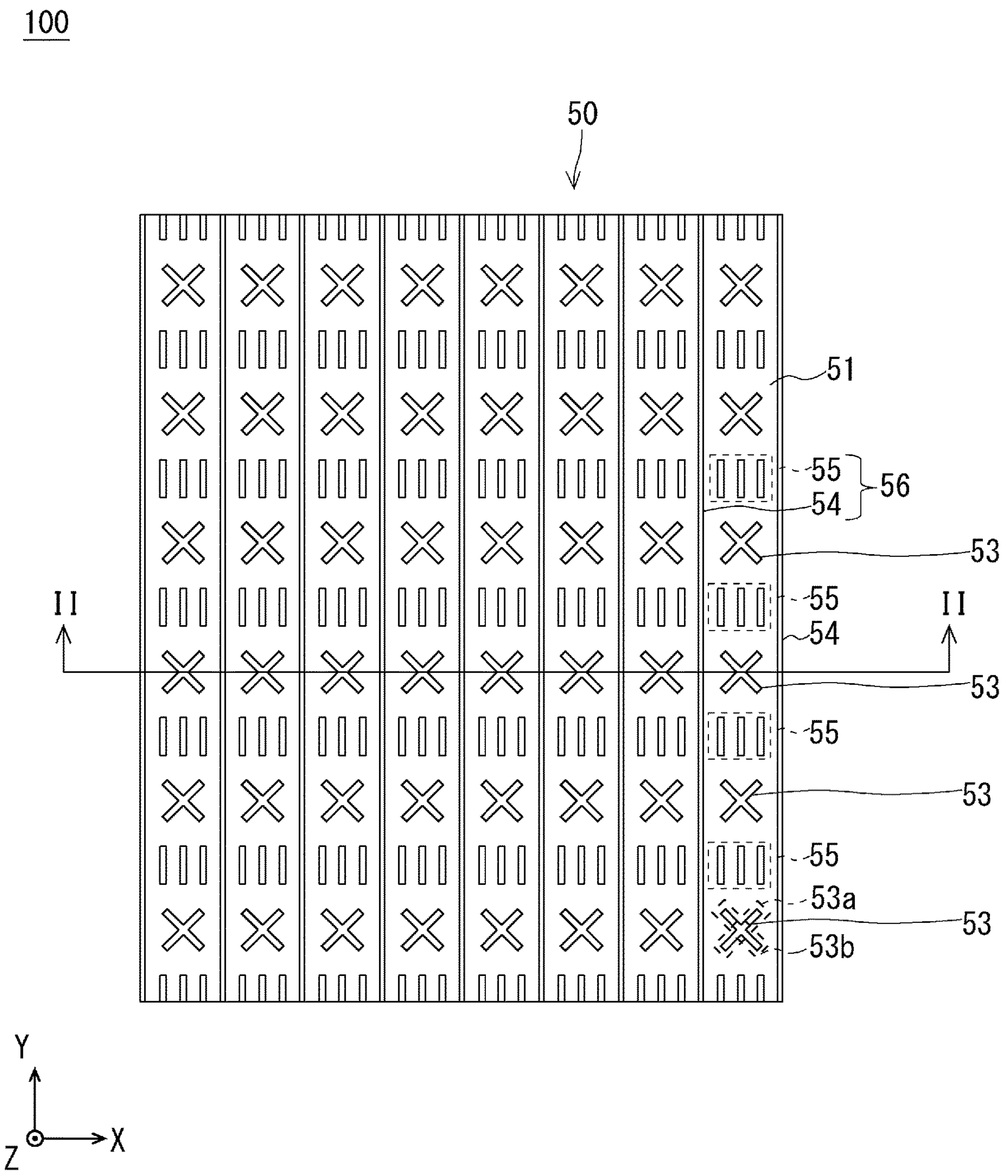
FIG. 1 is a schematic top view of an antenna apparatus according to a first example embodiment.

Hereinafter, example embodiments of the present disclosure will be described with reference to the drawings. Note that, the following description and the drawings are omitted and simplified as appropriate for clarity of description. In addition, in the following drawings, the same elements are denoted by the same reference signs, and redundant descriptions are omitted as necessary. In each example embodiment, a deviation in a direction being parallel, horizontal, vertical, and the like is allowed to an extent that an effect of the present disclosure is not impaired. In addition, in the drawings for describing the example embodiments, when a direction is not specifically described, a direction on the drawings is referred to.

Consideration Leading to the Example Embodiment

First, before describing details of the example embodiments, consideration leading to the example embodiments will be described.

An active antenna system (AAS) is known as an antenna apparatus used for fifth-generation mobile communication. The AAS enables flexible beamforming, multi user-multiple input multiple output (MU-MIMO), massive-MIMO, and the like by providing a transceiver for each antenna element constituting a super multi-element antenna array. As a result, since the AAS can spatially multiplex and collectively transmit a radio signal of a plurality of communication terminals and a plurality of layers, a cell throughput can be greatly improved, and frequency utilization efficiency can be improved.

In the AAS having a full digital beamforming function capable of MU-MIMO, a transceiver including an analog to digital converter (ADC), a digital to analog converter (DAC), a transmitter and receiver (TRX), and a radio frequency frontend (RF frontend) is provided associated to each antenna. Thus, since the number of transceivers increases in response to the number of antennas, electric power consumption in the AAS also increases as the number of antenna elements and the number of transceivers increases.

As described above, in general, in an antenna-integrated base station apparatus, a resin radome is used in order to protect an antenna surface of an antenna. When a resin radome is used, the resin radome is disposed on the antenna surface, but there is a possibility that the radome hinders when heat from the antenna apparatus is radiated. Since the AAS is provided with a large number of antenna elements, an area of an array antenna is also increased. Thus, when a resin radome is used for the AAS, it is difficult to radiate heat from the antenna surface of the AAS, and therefore, a radiator fin is provided in a housing provided on a rear surface side on an opposite side to the antenna surface of the AAS, and heat radiation is performed by increasing a height and the number of the fins. Therefore, when a resin radome is adopted for the AAS, an envelope volume of the heat radiation fin increases, weight of the heat radiation fin also increases, and thereby the AAS is led to an increase in size.

Meanwhile, a forced air cooling system and a natural air cooling system are known as a cooling system for suppressing an increase in temperature of an internal device. The forced cooling system is a system in which an internal device is cooled by pushing external air into the internal device or sucking overheated air out of the internal device, by providing a fan. The natural air cooling system is a system in which heat from an internal device is diffused, the heat is guided to a radiator fin, and then heat radiation efficiency is improved by securing a number of fins and a fin length and thereby expanding a heat radiation area with respect to an external environment.

When the forced cooling system is adopted for the AAS, an effect of heat radiation and a decrease in size can be expected, but since it is necessary to drive a fan or the like continuously, a failure due to continuous driving occurs and leads to a decrease in reliability, and immediate maintenance at a time of the failure is required. In addition, since the AAS is also deployed in an urban area, when the forced cooling system is adopted for the AAS, it leads to unwanted noise due to rotation noise of the fan. Thus, the AAS is more likely to adopt the natural cooling system than the forced cooling system. Therefore, even when the natural cooling system is adopted for the AAS, it is desired to increase the heat radiation efficiency of the AAS while achieving a decrease in size and weight reduction of the AAS. According to the present disclosure, a configuration capable of increasing the heat radiation efficiency of the AAS while suppressing an increase in size of the AAS is achieved.

First Example Embodiment

Figure 2:
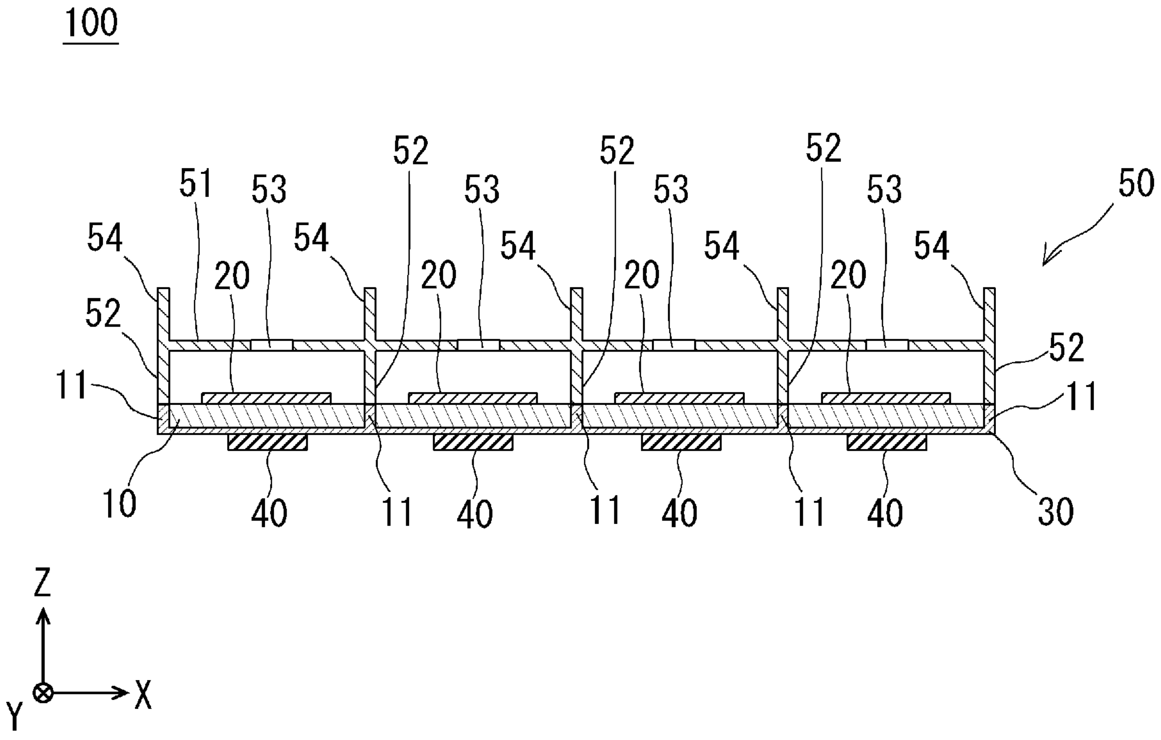
FIG. 2 is a schematic cross-sectional view of the antenna apparatus according to the first example embodiment.

A configuration example of an antenna apparatus 100 according to a first example embodiment will be described with reference to FIGS. 1 and 2. FIG. 1 is a schematic top view of an antenna apparatus according to the first example embodiment. FIG. 2 is an enlarged cross-sectional view of the antenna apparatus according to the first example embodiment, and is an enlarged cross-sectional view illustrating a part of a cross-sectional view taken along a cutting line II-II in FIG. 1. Note that, FIG. 1 is a top view in a state where a substrate 10 to be described later is substantially parallel to a horizontal surface, but when the antenna apparatus 100 is operated, since the substrate 10 to be described later is disposed substantially vertically with respect to the horizontal surface, FIG. 1 can also be referred to as a front view of the antenna apparatus 100.

The antenna apparatus 100 is an antenna array including a plurality of antenna elements, and may be, for example, an AAS. Since the antenna apparatus 100 includes a large number of antenna elements, it may be referred to as an antenna system. As illustrated in FIGS. 1 and 2, the antenna apparatus 100 includes the substrate 10, a plurality of antenna elements 20, a ground layer 30, a plurality of heat generating components 40, and a radome 50.

First, a configuration example of the antenna apparatus 100 will be described with reference to FIG. 2.

The substrate 10 is provided with an electrical wiring pattern, and a plurality of antenna elements 20 are disposed on a first surface of the substrate 10 in a Z-axis positive direction side. Since the first surface is a direction of radio wave radiation from the antenna element 20, it may be referred to as a front surface or a top surface, and a second surface of the substrate 10 on an opposite side to the first surface may be referred to as a back surface or a bottom surface. Each of the plurality of antenna elements 20 is disposed in such a way as to separate from each other by a predetermined distance in an X-axis direction on the top surface of the substrate 10. Each of the plurality of antenna elements 20 is electrically connected to the ground layer 30 and the radome 50 via a ground line provided on the front surface of the substrate 10. Note that, although omitted illustrating the drawings, each of the plurality of antenna elements 20 is disposed in such a way as to separate with each other by a predetermined interval in a Y-axis direction as well.

In the substrate 10, a thermal via 11 being a through hole penetrating through the substrate 10 is formed. The thermal via 11 is formed in the substrate 10 in a vicinity of the antenna element 20, and is formed between adjacent antenna elements 20. In other words, the thermal via 11 is formed around each antenna element 20, and the thermal via 11 is formed on the substrate 10 in such a way that each antenna element 20 is surrounded by the plurality of thermal vias 11. Note that, in FIG. 2, the thermal via 11 is formed between all the adjacent antenna elements 20, but the thermal via 11 may not be formed between some of the adjacent antenna elements 20.

Each of the antenna elements 20 may be disposed at an equal interval with the adjacent antenna element 20. The antenna element 20 is an antenna element that feeds power, and is, for example, a patch antenna. The antenna element 20 is a primary resonator in which a transceiver (not illustrated) connected to the back surface of the substrate 10 transmits and receives a signal. The antenna apparatus 100 radiates, by dual resonance of the antenna element 20 and a slot antenna element constituted by a slot 53 to be described later, a radio wave from the slot antenna element to a direction directing by the top surface of the substrate 10, and becomes transmittable and receivable of a signal to and from a communication apparatus in the direction.

For example, the same number of heat generating components 40 as the number of antenna elements 20 are connected to the back surface of the substrate 10. Each of the heat generating component 40 may be, for example, an amplifier (AMP). The ground layer 30 made of, for example, copper foil is formed on the back surface of the substrate 10 and the thermal via 11. Each heat generating component 40 connects the heat generating component 40 and the substrate 10 with each other via the ground layer 30. Each heat generating component 40 may be disposed at a position associated to each antenna element 20. Each of the plurality of heat generating components 40 may be disposed at a position sandwiching each antenna element 20 and the substrate 10 in a Z-axis negative direction of each antenna element 20. The heat generating component 40 is electrically connected to the antenna element 20 via the ground layer 30. In addition, the heat generating component 40 is thermally connected to the radome 50 to be described later, via the ground layer 30. In other words, it is configured that heat generated by the heat generating component 40 is capable of being transferred to the radome 50 via the thermal via 11. In other words, the thermal via 11 is configured as a heat radiation path, and transfers the heat generated by the heat generating component 40 to the radome 50.

Note that, although omitted illustrating in FIG. 2, the heat generating component 40 is connected to an external circuit via at least one of a signal line and a control line other than ground of the substrate 10. Further, between pieces of ground of a ground pad (GND PAD1) on the back surface of the heat generating component 40 or a ground pin (GND Pin) disposed around the heat generating component 40 is connected by reflow processing using a surface mount technology (SMT) or the like to a ground pattern surface (GND pattern) on the substrate 10. Alternatively, between pieces of ground of the ground pad (GND PAD1) on the back surface of the heat generating component 40 or the ground pin (GND Pin) disposed around the heat generating component 40 is connected by reflow processing using the surface mount technology (SMT) or the like to a ground terminal portion (GND PAD2) for connecting a ground pin. A ground connection portion indicating a portion where the pieces of ground are connected with each other is connected to the ground layer 30 in such a way as to form a heat radiation path not only by electrical grounding but also in thermal.

The radome 50 has thermal conductivity, and is, for example, a metal radome made of a metal such as aluminum, silver, and copper. Note that, the radome 50 may not be made of a metal, as long as it is a conductor having thermal conductivity. The radome 50 is fixed to the substrate 10 in a state of covering the substrate 10, and is configured as a protective member that protects the substrate 10. The radome 50 includes a planar portion 51 and a wall portion 52.

The planar portion 51 is disposed in parallel with the substrate 10 in such a way as to separate from the substrate 10 by a distance corresponding to a height of the wall portion 52 in a state of covering the substrate 10. In the planar portion 51, the same number of slots 53 as the number of the antenna elements 20 are formed at positions facing each antenna element 20 in a state of covering the substrate 10. Each of the plurality of slots 53 is formed at a position in the Z-axis positive direction of each antenna element 20. The slot 53 functions as a slot antenna element. The slot antenna element is a sub-resonator having a same resonance frequency as that of the antenna element 20, and functions as an antenna element that performs combination resonance with the antenna element 20 and widens a frequency band. In the antenna apparatus 100, since the slot 53 functions as the slot antenna element, it is possible to transmit and receive a signal to and from a communication apparatus in a direction to which an outer surface of the radome 50 on the opposite side to a front surface side of the substrate 10 is directed, in a wider frequency band. Note that, the radome 50 may be referred to as a slot antenna because the plurality of slots 53 function as a plurality of slot antenna elements.

In addition, the planar portion 51 includes a first heat radiation fin 54 protruding to an outer surface on the opposite side to the front surface side of the substrate 10. The first heat radiation fin 54 is a fin for radiating heat generated in the heat generating component 40 to an outside. The first heat radiation fin 54 is disposed in the vicinity of the slot 53 functioning as a slot antenna element. The first heat radiation fin 54 protrudes in the Z-axis positive direction and a vertical direction with respect to the planar portion 51, and protrudes to the outer surface of the planar portion 51 in such a way that the wall portion 52 extends in the Z-axis positive direction. The first heat radiation fin 54 transfers heat of the heat generating component 40 transferred from the wall portion 52 to the air, and thereby radiates the heat of the heat generating component 40 to the outside of the antenna apparatus 100. In other words, the outside air removes heat of the heat generating component 40 transferred from the wall portion 52 by touching a surface of the first heat radiation fin 54, and radiates the heat to the outside.

The wall portion 52 is provided in the Z-axis negative direction vertically to the planar portion 51. The wall portion 52 is provided in such a way as to connect to the substrate 10 and surround each antenna element 20, in a state where the radome 50 covers the substrate 10. Specifically, the wall portion 52 is provided in such a way as to connect to the substrate 10 between the adjacent antenna elements 20 in a state where the radome 50 covers the substrate 10. In addition, the wall portion 52 is provided in such a way as to connect to the substrate 10 in the vicinity of an end portion of the substrate 10 in a state where the radome 50 covers the substrate 10. The wall portion 52 is configured, in a state where the radome 50 covers the substrate 10, in such a way as to connect to the substrate 10, be thermally connected to the heat generating component 40 connected to the back surface of the substrate 10, and be capable of transferring heat of the heat generating component 40 to at least the first heat radiation fin 54. Specifically, the wall portion 52 is provided at a position covering the thermal via 11 formed on the substrate 10 in a state where the radome 50 covers the substrate 10, and is configured in such a way that heat of the heat generating component 40 is transferred from the thermal via 11 and the transferred heat can be transferred to at least the first heat radiation fin 54. Note that, heat of the heat generating component 40 is transferred from the wall portion 52 to the first heat radiation fin 54, and the first heat radiation fin 54 radiates the heat to the outside.

In addition, the wall portion 52 is electrically connected to the substrate 10 on which the antenna element 20 is disposed. As described above, since the wall portion 52 is provided between two adjacent antenna elements 20, each antenna element 20 is configured in such a way as to be capable of reducing an interaction with another antenna element 20 including the adjacent antenna element 20. In other words, the wall portion 52 reduces an interaction with another antenna element 20 with respect to each antenna element 20, and improves an antenna characteristic of the antenna apparatus 100.

Note that, FIG. 2 is a cross-sectional view taken along the cutting line II-II passing through a center of the slot 53 arranged in the X-axis direction in FIG. 1, but a cross-sectional view taken along a cutting line passing through the center of the slot 53 arranged in the Y-axis direction is also similar except for the heat radiation fin, and therefore illustration and description thereof are omitted.

Next, the planar portion 51 of the radome 50 will be described with reference to FIG. 1. The planar portion 51 includes a plurality of slots 53 formed at positions facing each antenna element 20, and a heat radiation fin 56 including a plurality of the first heat radiation fins 54 and a plurality of second heat radiation fins 55 provided between adjacent antenna elements 20. As illustrated in FIG. 1, the slot 53 has a shape of an X-shape.

Specifically, as illustrated in a lower right in FIG. 1, the slot 53 includes a first opening 53*a* extending in a first direction, for example, having an angle with the X-axis of 45 degrees, and a second opening 53*b* extending in a second direction being different from the first direction, for example, having an angle with the X-axis of 135 degrees (−45 degrees). The first opening 53*a* and the second opening 53*b* are, for example, rectangular openings. The slot 53 is formed in such a way that the first opening 53*a* and the second opening 53*b* intersect each other at, for example, a center position of the slot 53. The slot 53 functions as a slot antenna element capable of transmitting and receiving two polarized waves. Thus, the slot 53 includes the first opening 53*a* and the second opening 53*b*.

Note that, understandably, the angle formed between the first direction and the second direction, and the X-axis is not limited to the above, may be set as appropriate, and the shapes of the first opening 53*a* and the second opening 53*b* may not be rectangular. In addition, the slot 53 may function as a slot antenna element associated to, for example, one polarized wave, and the slot 53 may include one opening of the first opening 53*a* and the second opening 53*b*.

The heat radiation fin 56 protrudes to the outer surface of the planar portion 51 on the opposite side to the front surface side of the substrate 10. In other words, the first heat radiation fin 54 and the second heat radiation fin 55 protrude to the outer surface of the planar portion 51 on the opposite side to the front surface side of the substrate 10. The heat radiation fin 56 is disposed between two adjacent slots 53 in the vicinity of the slot 53 functioning as a slot antenna element.

The first heat radiation fin 54 is disposed between two slots 53 adjacent to each other in the X-axis direction. The first heat radiation fin 54 is disposed between two slots 53 adjacent to each other in the X-axis direction, and extends from an end portion of the planar portion 51 in the Y-axis negative direction to an end portion of the planar portion 51 in the Y-axis positive direction. Note that, a shape of the first heat radiation fin 54 illustrated in FIG. 1 is one example, and thus another shape may be used.

The second heat radiation fin 55 is disposed between two slots 53 adjacent to each other in the Y-axis direction. In addition, the second heat radiation fin 55 is disposed between two adjacent first heat radiation fins 54. The second heat radiation fin 55 is configured by three rectangular heat radiation fins whose longitudinal direction is the Y-axis direction and whose lateral direction is the X-axis direction. The second heat radiation fin 55 is configured by three heat radiation fins that are shorter in length in the longitudinal direction than the first heat radiation fin 54. Since the second heat radiation fin 55 includes three heat radiation fins, it may be referred to as a heat radiation fin group. Note that, the second heat radiation fin 55 is configured by three heat radiation fins, but the number of heat radiation fins included in the second heat radiation fin 55 may not be three. In addition, since the shapes of the first heat radiation fin 54 and the second heat radiation fin 55 illustrated in FIG. 1 are one example, another shape may be used.

Figure 3:
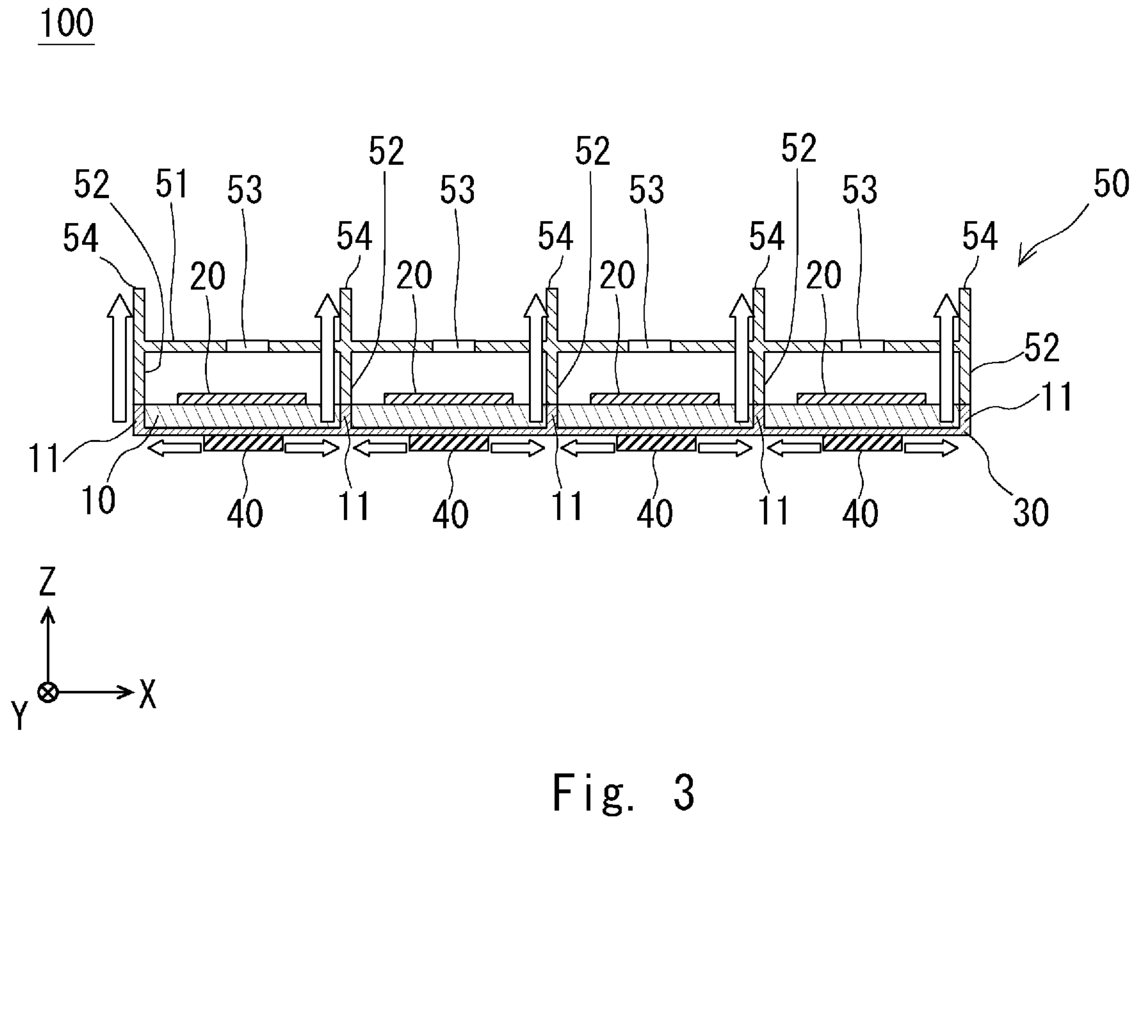
FIG. 3 is a diagram for describing a flow of heat radiation in the antenna apparatus according to the first example embodiment.

Next, a flow of heat radiation in the antenna apparatus 100 in the first example embodiment will be described with reference to FIG. 3. FIG. 3 is a diagram for describing a flow of heat radiation in the antenna apparatus according to the first example embodiment. FIG. 3 is a diagram being added a white arrow illustrating a flow of heat generated by the heat generating component 40 to a schematic cross-sectional view illustrated in FIG. 2. As illustrated in FIG. 3, heat generated in the heat generating component 40 is transferred to the wall portion 52 of the radome 50 having thermal conductivity via the ground layer 30.

Specifically, the heat generating component 40 is positioned in the Z-axis negative direction of the antenna element 20, and the thermal via 11 is formed between two adjacent antenna elements 20. The heat generated in the heat generating component 40 is transferred to the two wall portions 52 covering the two thermal vias 11, via at least two thermal vias 11 disposed in the vicinity of the heat generating component 40. Then, the heat of the heat generating component 40 transferred to the two wall portions 52 is transferred to the planar portion 51, and is radiated from the heat radiation fin 56 disposed in the vicinity of the slot 53 functioning as a slot antenna element in the planar portion 51.

As described above, the antenna apparatus 100 includes the radome 50 having thermal conductivity that also functions as a slot antenna and protects the substrate 10 on which the antenna element 20 is disposed. The radome 50 includes the heat radiation fin 56 on the outer surface, and the heat radiation fin 56 is provided in the vicinity of the slot 53 functioning as a slot antenna element. The substrate 10 includes the thermal via 11, and is configured as a heat radiation path for transferring heat generated from the heat generating component 40 to the heat radiation fin. Further, the radome 50 includes the wall portion 52, between two adjacent antenna elements 20, that can transfer the heat of the heat generating component 40 to the heat radiation fin 56. Since the antenna apparatus 100 includes such a configuration, heat of the heat generating component 40 can be radiated to the outside.

Herein, Patent Literature 1 does not disclose an antenna apparatus including a heat radiation fin. Thus, when an antenna apparatus including a large number of antenna elements is achieved by using the technique disclosed in Patent Literature 1, a heat radiation fin is required in addition to a housing made of a conductor, and there is a possibility that the antenna apparatus becomes an increase in size. In contrast, in the antenna apparatus 100 according to the first example embodiment, since the radome 50 protecting the antenna element 20 includes the heat radiation fin 56, it is not necessary to provide the heat radiation fin 56 in addition to the radome 50. Therefore, according to the antenna apparatus 100 according to the first example embodiment, since it is not necessary to provide the heat radiation fin on a rear surface side of the antenna apparatus 100, it is possible to suppress the increase in size of the antenna apparatus.

Further, since the radome 50 includes the heat radiation fin 56, the antenna apparatus 100 can further dispose the heat radiation fin on the rear surface side of the antenna apparatus 100. Therefore, according to the antenna apparatus 100 according to the first example embodiment, it is possible to further provide a heat radiation path on the rear surface of the antenna apparatus 100, and to improve a degree of freedom in mounting the antenna apparatus 100. Further, according to the antenna apparatus 100 according to the first example embodiment, the antenna apparatus can be decreased in size even when the antenna element is mounted at a high density, and a manufacturing cost can be suppressed.

In addition, in the antenna apparatus 100, heat generated from each of the plurality of heat generating components 40 can be radiated from the heat radiation fin 56 via at least two thermal vias 11 and two wall portions 52 covering the two thermal vias 11, which are provided in the vicinity of each of the heat generating components 40. In other words, the antenna apparatus 100 can radiate the heat generated by each of the plurality of heat generating components 40 from the heat radiation fin 56 via a plurality of heat transfer paths. Therefore, according to the antenna apparatus 100 according to the first example embodiment, it is possible to increase heat radiation efficiency.

Further, in the antenna apparatus 100, since the wall portion 52 is electrically connected to the substrate 10 and is provided between two adjacent antenna elements 20, an interaction with another antenna element 20 can be reduced with respect to each antenna element 20. In contrast, since the antenna apparatus according to Patent Literature 1 does not include the wall portion 52 included in the antenna apparatus 100 according to the first example embodiment, the antenna apparatus according to Patent Literature 1 causes multiple resonance in a space in a housing made of a conductor. Thus, in a case of using the antenna apparatus according to Patent Literature 1, since a measure such as attaching an absorber is required in order to suppress multiple resonance, an antenna gain may be deteriorated or a high-cost structure may be acquired. On the other hand, according to the antenna apparatus 100 according to the first example embodiment, since an interaction between the antenna elements 20 can be reduced, reduction in antenna gain can be suppressed. Further, according to the antenna apparatus 100 according to the first example embodiment, since it is not necessary to attach an absorber for suppressing multiple resonance, it is possible to suppress a development cost and a manufacturing cost.

In addition, in an antenna apparatus, when a resin radome is used in order to protect an antenna surface, a front surface of the antenna apparatus cannot be used for heat radiation. Thus, when a resin radome is used in the antenna apparatus, it is necessary to provide a heat radiation fin on a rear surface of the antenna apparatus. In contrast, since the antenna apparatus 100 according to the first example embodiment includes the radome 50 having thermal conductivity, a configuration including a heat radiation mechanism on the front surface of the antenna can be achieved. Then, since the radome 50 includes the heat radiation fin 56, it is not necessary to further include the heat radiation fin 56 in addition to the radome 50. Therefore, according to the antenna apparatus 100 according to the first example embodiment, it is possible to increase heat radiation efficiency of the antenna apparatus, and to contribute a decrease in size of the antenna apparatus. Further, in the antenna apparatus 100, an antenna characteristic of the antenna apparatus 100 can be further increased by optimizing a size and positional relationship of the heat radiation fins 56 and correcting antenna pattern distortion caused by an influence of mutual coupling between the antenna elements 20.

In addition, in an antenna apparatus, when a resin radome is used in order to protect the antenna surface, it is necessary to secure a certain amount of space between the antenna element and the resin radome in order to appropriately adjust the antenna characteristic. In contrast, in the antenna apparatus 100 according to the first example embodiment, since the slot antenna element and the radome 50 are formed of the same member, it is not necessary to provide a space between the antenna element and the radome, and thus it is possible to contribute to a decrease in size of an apparatus volume.

Modification Example 1

In the first example embodiment, a shape of a slot 53 is described as being an X-shape, but the shape of the slot 53 may be a so-called dog-bone type, and the slot 53 may function as a dog-bone antenna.

Figure 4:
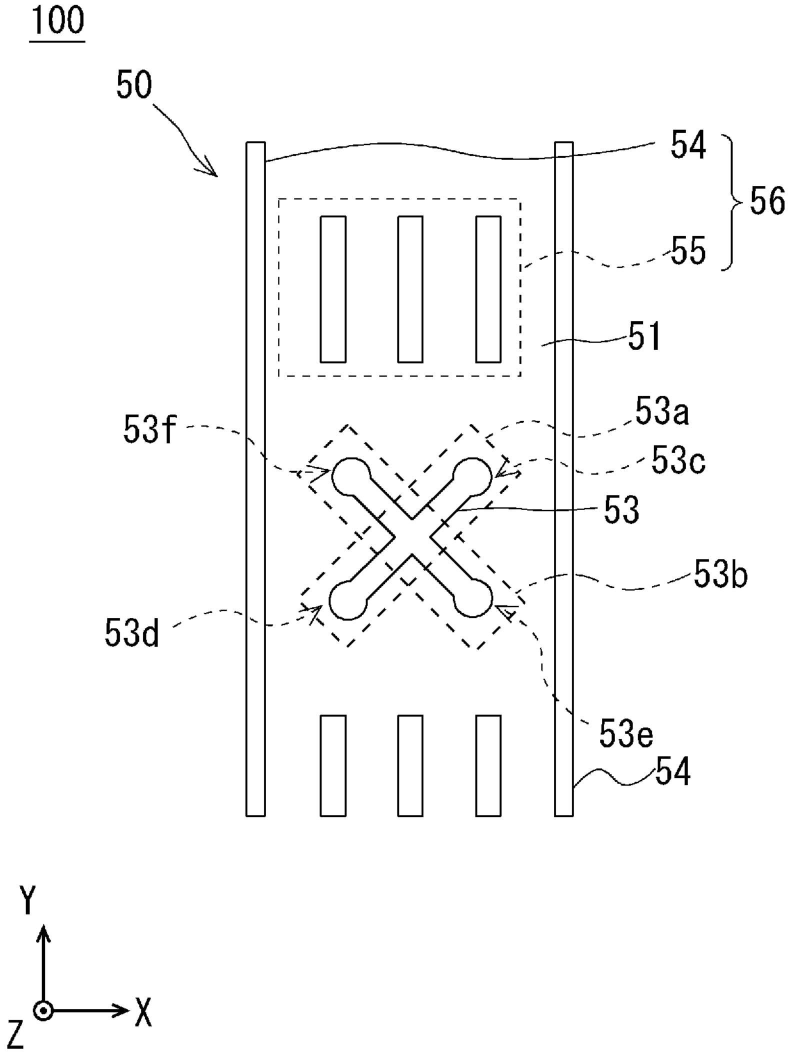
FIG. 4 is an enlarged view enlarging a planar portion of a radome according to a modification example 1.

FIG. 4 is an enlarged view enlarging a planar portion 51 of a radome 50 according to a modification example 1. Specifically, FIG. 4 is an enlarged view enlarging one slot 53 of the plurality of slots 53 provided in the planar portion 51. Note that, in the modification example 1, the shape of the slot 53 is different from that of the first example embodiment, but other configurations are similar to those of the first example embodiment, and therefore description thereof will be omitted as appropriate.

As illustrated in FIG. 4, the slot 53 includes a first opening **53*a* extending in a first direction and a second opening 53*b* extending in a second direction, similarly to the first example embodiment, and the first opening 53*a* and the second opening 53*b* are formed to intersect at, for example, a center position of the slot 53. In addition, both ends of the first opening 53*a* and the second opening 53*b* of the slot 53** are widened.

Specifically, in an end portion **53*c* and an end portion 53*d* that are both ends of the first opening portion 53*a*, a width in a vertical direction orthogonal to the first direction is wider than a width in the vertical direction in a portion of the first opening portion 53*a* being different from both ends of the first opening portion 53*a*. In addition, in an end portion 53*e* and an end portion 53*f* that are both ends of the second opening portion 53*b*, a width in the vertical direction orthogonal to the second direction is wider than a width in the vertical direction in a portion of the second opening portion 53*b* being different from both ends of the second opening portion 53*b***.

As described above, even when the shape of the slot 53 in the first example embodiment is modified as in the modification example 1, a similar advantageous effect as that in the first example embodiment can be acquired. In addition, when the shape of the slot 53 in the first example embodiment is modified as in the modification example 1, a frequency band of an antenna apparatus 100 can be widened.

Modification Example 2

In the first example embodiment, a configuration may be modified with respect to an antenna apparatus 100 in such a way that an inside of the antenna apparatus 100 does not corrode.

Figure 5:
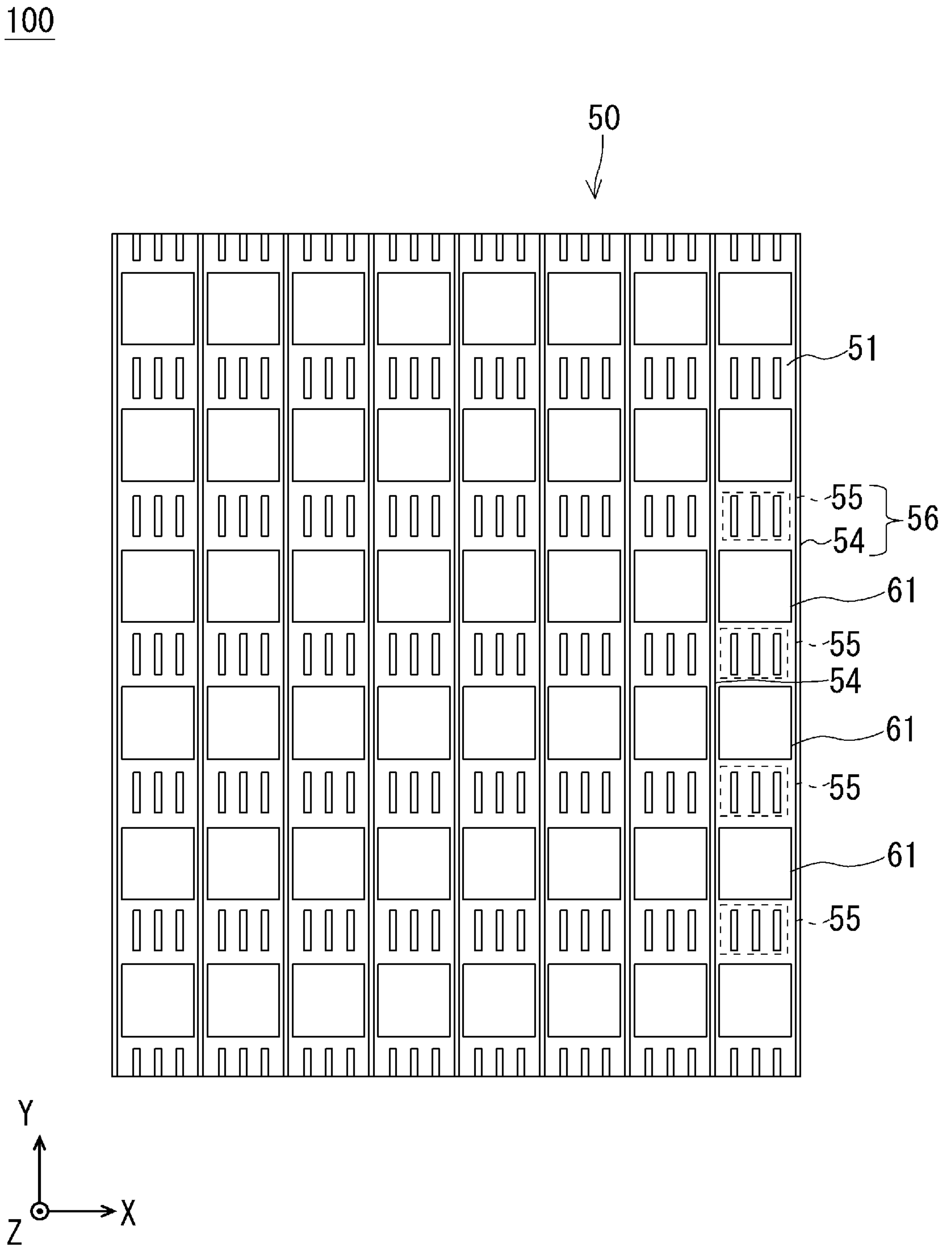
FIG. 5 is a schematic top view of an antenna apparatus according to a modification example 2.
Figure 6:
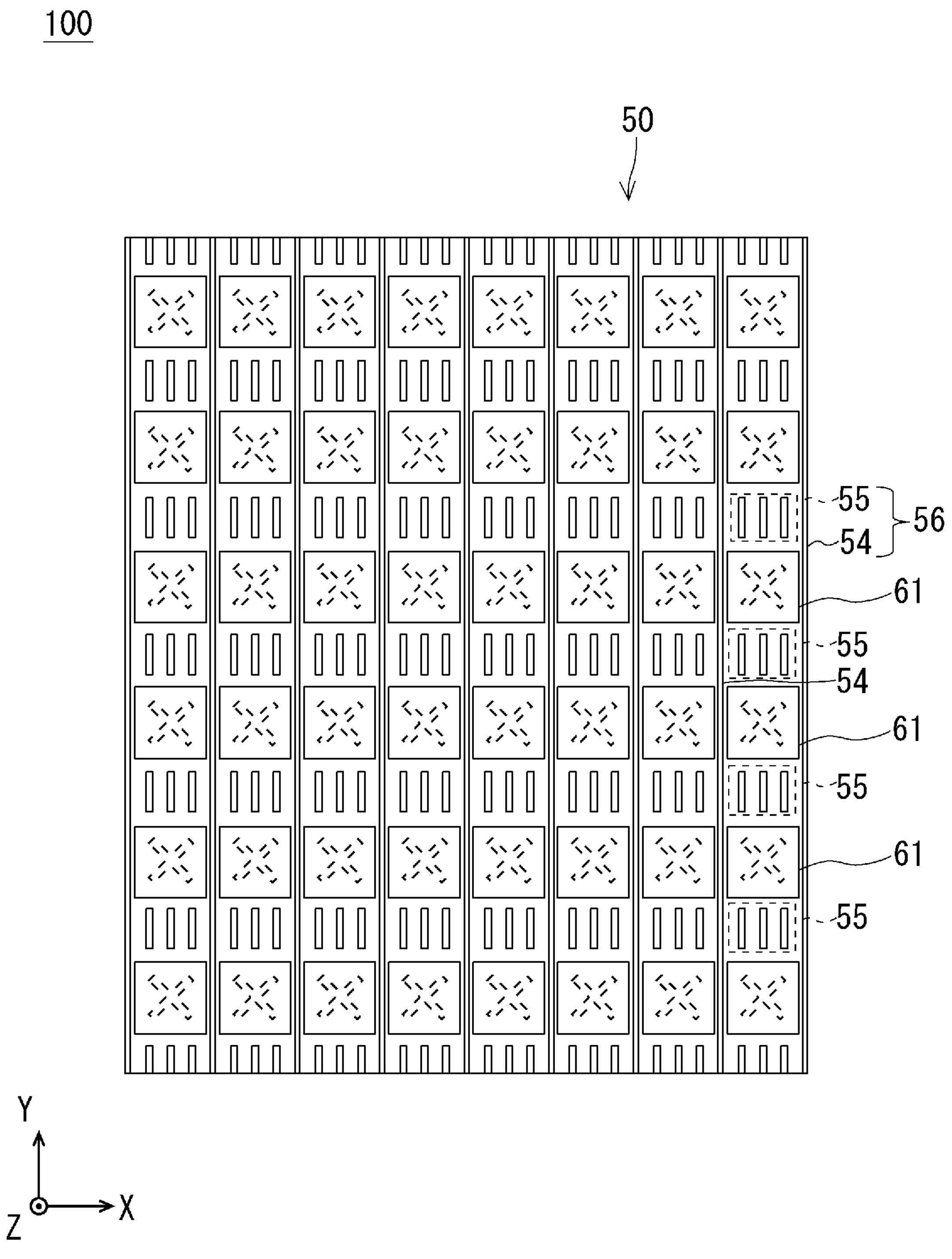
FIG. 6 is a schematic top view of the antenna apparatus according to the modification example 2.

FIGS. 5 and 6 are schematic top views of an antenna apparatus according to a modification example 2. Specifically, FIG. 6 is a transmission view transmitted through a slot portion of the antenna apparatus 100 according to the modification example 2.

As illustrated in FIGS. 5 and 6, a sealing material 61 for sealing a slot 53 is disposed in a Z-axis positive direction of the slot 53. The sealing material 61 is a resin that transmits a radio wave. Note that, the slot 53 may be sealed by filling the slot 53 with a liquid resin such as a silicone. As described above, even when the antenna apparatus 100 according to the first example embodiment is made as the modification example 2, a similar advantageous effect as that of the first example embodiment can be acquired. In addition, in the antenna apparatus 100 according to the modification example 2, since the slot 53 is sealed with a resin and has an airtight structure, corrosion inside an apparatus of the antenna apparatus 100 can be prevented.

Second Example Embodiment

Next, a second example embodiment will be described. The second example embodiment is different from the first example embodiment in manner in which a heat generating component 40 is connected to a substrate 10.

Figure 7:
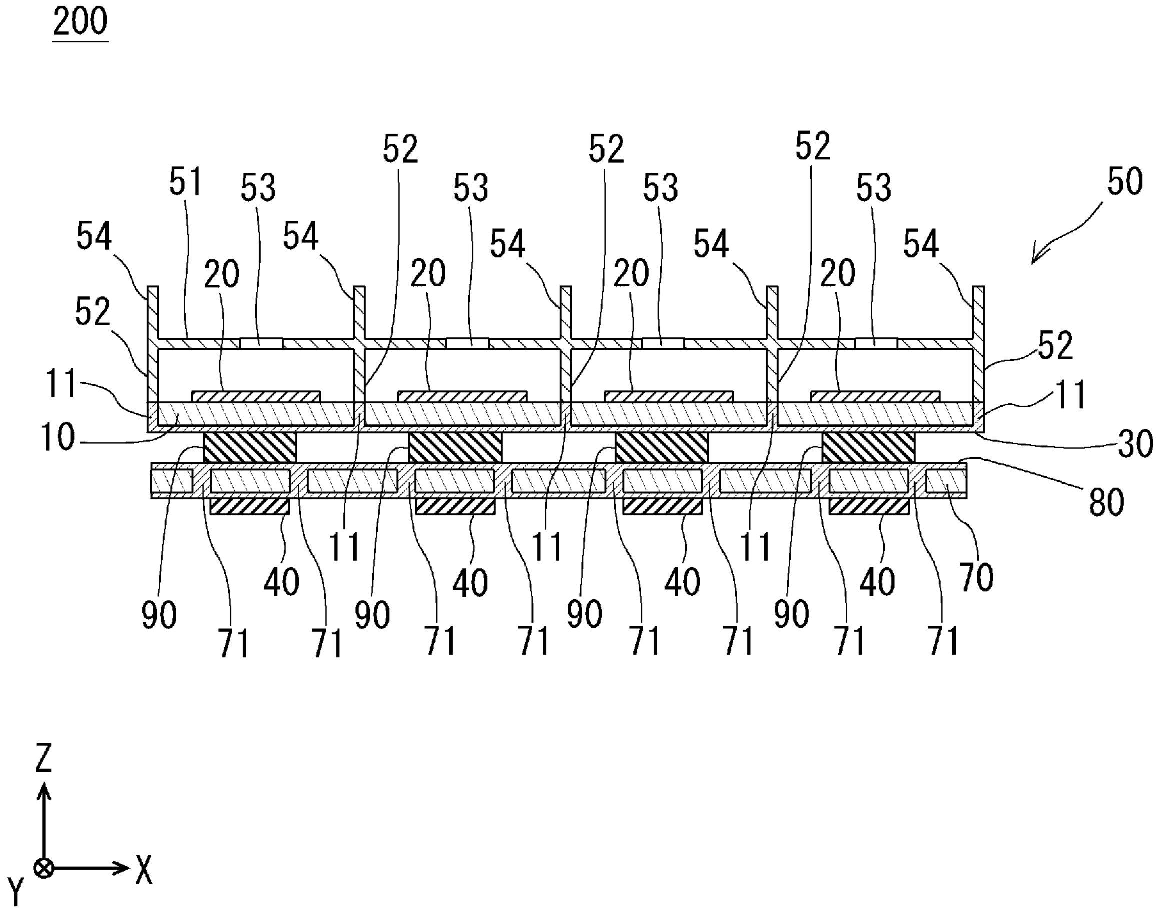
FIG. 7 is a schematic cross-sectional view of an antenna apparatus according to a second example embodiment.

A configuration example of an antenna apparatus 200 according to the second example embodiment will be described with reference to FIG. 7. FIG. 7 is a schematic cross-sectional view of the antenna apparatus according to the second example embodiment, and is a view corresponding to FIG. 2. Note that, in the second example embodiment, a schematic front view of the antenna apparatus is similar, and thus illustration and description thereof are omitted. In other words, since a radome 50 according to the second example embodiment has a similar configuration as the first example embodiment, a description thereof will be omitted as appropriate.

The antenna apparatus 200 includes substrates 10 and 70, a plurality of antenna elements 20, ground layers 30 and 80, a plurality of heat generating components 40, the radome 50, and a heat transfer member 90. The antenna apparatus 200 has a configuration further including the substrate 70, the ground layer 80, and the heat transfer member 90 in a configuration of the antenna apparatus 100 according to the first example embodiment. Note that, the substrate 10, the plurality of antenna elements 20, the ground layer 30, the plurality of heat generating components 40, and the radome 50 are basically similar to those in the first example embodiment, and therefore common descriptions are omitted as appropriate.

The substrate 70 is a substrate on which the heat generating component 40 is disposed. In the substrate 70, the same number of heat generating components 40 as the number of antenna elements 20 are disposed on a fourth surface on an opposite side to a third surface facing the substrate 10. In other words, the same number of heat generating components 40 as the number of antenna elements 20 are disposed on a bottom surface of the substrate 70 in a Z-axis negative direction. Since the third surface faces the same direction as a front surface of the substrate 10, the third surface may be referred to as a front surface or a top surface of the substrate 70, and the fourth surface may be referred to as a back surface or the bottom surface of the substrate 70. Each of the plurality of heat generating components 40 may be disposed at a position associated to each antenna element 20. In other words, each of the plurality of heat generating components 40 may be disposed in the Z-axis negative direction of each antenna element 20.

In the substrate 70, a thermal via 71 being a through hole penetrating through the substrate 70 is formed. The thermal via 71 is formed in the substrate 70 in a vicinity of the heat generating component 40. The thermal via 71 is formed around each heat generating component 40, for example. In other words, the thermal via 71 is formed on the substrate 70 in such a way that each of the heat generating components 40 is surrounded by the plurality of thermal vias 71.

In the substrate 70, the same number of heat transfer members 90 as the number of the antenna elements 20 and the number of the heat generating components 40 are disposed on the front surface facing the substrate 10. Each of the plurality of heat transfer members 90 is disposed at a position associated to each antenna element 20 and each heat generating component 40. In other words, each of the plurality of heat transfer members 90 is disposed in the Z-axis negative direction of each of the antenna elements 20, and is disposed in the Z-axis positive direction of each of the heat generating components 40.

The ground layer 80 made of, for example, copper foil is formed on the front surface of the substrate 70, the thermal via 71, and the back surface of the substrate 70. Each heat generating component 40 connects the heat generating component 40 and the heat transfer member 90 with each other via the ground layer 80. The heat generating component 40 is electrically and thermally connected to the heat transfer member 90 via the ground layer 80. In other words, the heat generating component 40 is configured to be capable of transferring heat of the heat generating component 40 to the heat transfer member 90 via the thermal via 71. In other words, the thermal via 71 is configured as a heat radiation path, and transfers the heat generated by the heat generating component 40 to the heat transfer member 90.

Note that, although omitted illustrating in FIG. 7, the heat generating component 40 is connected to an external circuit via at least one of a signal line and a control line other than ground of the substrate 10. Further, between pieces of ground of a ground pad (GND PAD1) on the back surface of the heat generating component 40 or a ground pin (GND Pin) disposed around the heat generating component 40 is connected by reflow processing using a surface mount technology (SMT) or the like to a ground pattern surface (GND pattern) on the substrate 10. Alternatively, between pieces of ground of the ground pad (GND PAD1) on the back surface of the heat generating component 40 or the ground pin (GND Pin) disposed around the heat generating component 40 is connected by reflow processing using the surface mount technology (SMT) or the like to a ground terminal portion (GND PAD2) for connecting a ground pin. A ground connection portion indicating a portion where the pieces of ground are connected with each other is connected to the ground layer 80 in such a way as to form a heat radiation path not only by electrical grounding but also in thermal.

The heat transfer member 90 connects the substrate 10 and the substrate 70 with each other. In other words, the substrate 10 is disposed on the back surface of the substrate 10 in such a way as to connect to the heat transfer member 90. The heat transfer member 90 may be a filter (filter component), or may be a high-frequency coaxial connection line. When the heat transfer member 90 is a filter, the heat transfer member 90 may be an RF band pass filter (BPF) configured by a structure having highly thermoelectric conductivity. The RF BFP may electrically and thermally connect an RF circuit (not illustrated), a TRX circuit (not illustrated), and a digital circuit (not illustrated) disposed on the substrate 70 to the antenna element 20 disposed on the substrate 10. In other words, the RF BPF may be effectively utilized both in an electrical circuit manner and in a heat radiation path manner between each antenna element 20, and the RF and the TRX.

The heat transfer member 90 connects the back surface of the substrate 10 on an opposite side to the front surface on which the antenna element 20 is disposed, to the front surface of the substrate 70. The heat transfer member 90 is electrically connected to the heat generating component 40 and the antenna element 20. In addition, the heat transfer member 90 is thermally connected to the heat generating component 40 and a wall portion 52 of the radome 50. In other words, it is configured that heat generated by the heat generating component 40 can be transferred to the wall portion 52 via the heat transfer member 90. In other words, the wall portion 52 of the radome 50 is configured to be capable of transferring the heat of the heat generating component 40 to a heat radiation fin 56 via the heat transfer member 90. Specifically, the wall portion 52 is configured to be capable of transferring the heat of the heat generating component 40 to the heat radiation fin 56 via the thermal via 71, the heat transfer member 90, and the thermal via 11.

Note that, in order to improve heat transfer efficiency, a heat transfer sheet may be disposed between the substrate 10 and the heat transfer member 90, or between the heat transfer member 90 and the substrate 70. In addition, when the heat transfer member 90 is a high-frequency coaxial connection line, a filter is mounted on the bottom surface of the substrate 10. Then, the substrate 70 on which a transceiver for a frequency common use (not illustrated) is disposed is mounted as a configuration in which a frequency common use is possible by exchanging and connecting a frequency dependent substrate 10 according to an operating frequency band.

Next, a flow of heat radiation in the antenna apparatus 200 in the second example embodiment will be described with reference to FIG. 8. FIG. 8 is a diagram for describing a flow of heat radiation in the antenna apparatus according to the second example embodiment. FIG. 8 is a diagram being added a white arrow illustrating a flow of heat generated by the heat generating component 40 to a schematic cross-sectional view illustrated in FIG. 7. As illustrated in FIG. 8, heat generated in the heat generating component 40 is transferred to the heat transfer member 90 via the ground layer 80. Specifically, the heat generating component 40 is disposed at a position of the heat transfer member 90 and the antenna element 20 in the Z-axis negative direction, and the thermal via 71 is formed in the vicinity of the heat generating component 40. The heat generated in the heat generating component 40 is transferred to the heat transfer member 90 via at least two thermal vias 71 disposed in the vicinity of the heat generating component 40.

The heat of the heat generating component 40 is transferred to the ground layer 30 disposed on the back surface of the substrate 10 via the heat transfer member 90, and is transferred to the wall portion 52 of the radome 50 via the ground layer 30. Specifically, the heat transfer member 90 is disposed at a position of the antenna element 20 in the Z-axis negative direction, and the thermal via 11 is formed between two adjacent antenna elements 20. The heat generated in the heat generating component 40 is transferred to the two wall portions 52 covering the two thermal vias 11, via at least two thermal vias 11 disposed in the vicinity of the heat generating component 40. Then, the heat of the heat generating component 40 transferred to the two wall portions 52 is transferred to a planar portion 51, and is radiated from the heat radiation fin 56 disposed in the vicinity of a slot 53 functioning as a slot antenna element in the planar portion 51.

As described above, in the antenna apparatus 200, a position where the heat generating component 40 is disposed is different from that in the first example embodiment, but the thermal via 71 is formed on the substrate 70, and the ground layer 80 is formed on the thermal via 71 and the top surface of the substrate 70. In addition, the antenna apparatus 200 is provided with the heat transfer member 90 connected to the ground layer 80 and the ground layer 30. Thus, the antenna apparatus 200 can radiate heat generated by the heat generating component 40 to an outside via the thermal via 71, the ground layer 80, the heat transfer member 90, the ground layer 30, the thermal via 11, the wall portion 52, the planar portion 51, and the heat radiation fin 56. Therefore, the antenna apparatus 200 according to the second example embodiment can acquire a similar advantageous effect as that of the first example embodiment.

Note that, the present disclosure is not limited to the above-described example embodiments, and can be appropriately modified without departing from a scope of the present disclosure. Further, the present disclosure may be implemented by appropriately combining each of the example embodiments.

In addition, some or all of the above-described example embodiments may be described as the following supplementary notes, but are not limited thereto.

Supplementary Note 1

An antenna apparatus including:

a first substrate configured to dispose a plurality of antenna elements on a first surface; and a radome configured to cover the first substrate, form a plurality of slots at positions facing each of the plurality of antenna elements, and have thermal conductivity, wherein the radome includes a heat radiation fin configured to protrude to an opposite side to the first surface side, and a wall portion configured to be provided between a first antenna element and a second antenna element being adjacent to the first antenna element among the plurality of antenna elements, and be capable of transferring heat of a heat generating component connected to the first substrate to the heat radiation fin.

Supplementary Note 2

The antenna apparatus according to supplementary note 1, wherein the heat radiation fin is disposed between a first slot and a second slot being adjacent to the first slot among the plurality of slots.

Supplementary Note 3

The antenna apparatus according to supplementary note 1 or 2, wherein the first substrate includes a first thermal via penetrating through the first substrate and being provided between the first antenna element and the second antenna element, and the wall portion is provided at a position covering the first thermal via in a state where the radome covers the first substrate, and is able to transfer heat of the heat generating component to the heat radiation fin via the first thermal via.

Supplementary Note 4

The antenna apparatus according to any one of supplementary notes 1 to 3, wherein the heat generating component is disposed on a second surface on an opposite side to the first surface of the first substrate.

Supplementary Note 5

The antenna apparatus according to any one of supplementary notes 1 to 3, further including:

a second substrate configured to dispose the heat generating component; and a heat transfer member configured to connect a second surface on an opposite side to the first surface of the first substrate and the second substrate with each other, wherein the wall portion is able to transfer heat of the heat generating component to the heat radiation fin via the heat transfer member.

Supplementary Note 6

The antenna apparatus according to supplementary note 5, wherein the second substrate includes a second thermal via penetrating through the second substrate, the heat generating component is disposed on a fourth surface on an opposite side to a third surface on the second surface side, and the wall portion is able to transfer heat of the heat generating component to the heat radiation fin via the second thermal via and the heat transfer member.

Supplementary Note 7

The antenna apparatus according to supplementary note 6, wherein the heat transfer member is a filter or a high-frequency coaxial connection line.

Supplementary Note 8

The antenna apparatus according to any one of supplementary notes 1 to 7, wherein each of the plurality of slots is formed by intersecting a first opening extending in a first direction and a second opening extending in a second direction being different from the first direction.

Supplementary Note 9

The antenna apparatus according to supplementary note 8, wherein both ends of the first opening and the second opening are widened.

Supplementary Note 10

The antenna apparatus according to any one of supplementary notes 1 to 9, wherein the plurality of slots are sealed with a resin.

Supplementary Note 11

A radome having thermal conductivity, the radome including:

a planar portion configured to form a plurality of slots at positions facing each of a plurality of antenna elements and include a heat radiation fin protruding to an opposite side to a first surface side, in a state of covering a first substrate of which the plurality of antenna elements are disposed on the first surface; and a wall portion configured to be provided between a first antenna element and a second antenna element being adjacent to the first antenna element among the plurality of antenna elements, and be capable of transferring heat of a heat generating component connected to the first substrate to the heat radiation fin.

Supplementary Note 12

The radome according to supplementary note 11, wherein the heat radiation fin is disposed between a first slot and a second slot being adjacent to the first slot among the plurality of slots.

Supplementary Note 13

The radome according to supplementary note 12, wherein the wall portion is provided at a position covering the first thermal via being formed on the first substrate in a state where the radome covers the first substrate, and is able to transfer heat of the heat generating component to the heat radiation fin via the first thermal via.

Supplementary Note 14

The radome according to any one of supplementary notes 11 to 13, wherein each of the plurality of slots is formed by intersecting a first opening extending in a first direction and a second opening extending in a second direction being different from the first direction.

Supplementary Note 15

The radome according to supplementary note 14, wherein both ends of the first opening and the second opening are widened.

Supplementary Note 16

The radome according to any one of supplementary notes 11 to 15, wherein the plurality of slots are sealed with a resin.

Although the invention of the present application has been described with reference to the example embodiments, the invention of the present application is not limited to the above. Various modifications that can be understood by a person skilled in the art within the scope of the invention can be made to the configuration and details of the invention of the present application.

This application is based upon and claims the benefit of priority from Japanese patent application No. 2021-023028, filed on Feb. 17, 2021, the disclosure of which is incorporated herein in its entirety by reference.

REFERENCE SIGNS LIST

10, 70 SUBSTRATE
11, 71 THERMAL VIA
20 ANTENNA ELEMENT
30, 80 GROUND LAYER
40 HEAT GENERATING COMPONENT
50 RADOME
51 PLANAR PORTION
52 WALL PORTION
53 SLOT
**53*a*** FIRST OPENING
**53*b*** SECOND OPENING
**53*c*, 53*d*, 53*e*, 53*f*** END PORTION
54 FIRST HEAT RADIATION FIN

55 SECOND HEAT RADIATION FIN
56 HEAT RADIATION FIN
61 SEALING MATERIAL
90 HEAT TRANSFER MEMBER
100, 200 ANTENNA APPARATUS

What is claimed is:

1. An antenna apparatus comprising:
a first substrate configured to dispose a plurality of antenna elements on a first surface; and
a radome configured to cover the first substrate, form a plurality of slots at positions facing each of the plurality of antenna elements, and have thermal conductivity,
wherein the radome includes
a heat radiation fin configured to protrude to an opposite side to the first surface side, and
a wall portion configured to be provided between a first antenna element and a second antenna element being adjacent to the first antenna element among the plurality of antenna elements, and be capable of transferring heat of a heat generating component connected to the first substrate to the heat radiation fin.

2. The antenna apparatus according to claim 1, wherein the heat radiation fin is disposed between a first slot and a second slot being adjacent to the first slot among the plurality of slots.

3. The antenna apparatus according to claim 1, wherein
the first substrate includes a first thermal via penetrating through the first substrate and being provided between the first antenna element and the second antenna element, and the wall portion is provided at a position covering the first thermal via in a state where the radome covers the first substrate, and is able to transfer heat of the heat generating component to the heat radiation fin via the first thermal via.

4. The antenna apparatus according to claim 1, wherein the heat generating component is disposed on a second surface on an opposite side to the first surface of the first substrate.

5. The antenna apparatus according to claim 1, further comprising:
a second substrate configured to dispose the heat generating component; and
a heat transfer member configured to connect a second surface on an opposite side to the first surface of the first substrate, and the second substrate with each other,
wherein the wall portion is able to transfer heat of the heat generating component to the heat radiation fin via the heat transfer member.

6. The antenna apparatus according to claim 5, wherein
the second substrate includes a second thermal via penetrating through the second substrate,
the heat generating component is disposed on a fourth surface on an opposite side to a third surface on the second surface side, and
the wall portion is able to transfer heat of the heat generating component to the heat radiation fin via the second thermal via and the heat transfer member.

7. The antenna apparatus according to claim 6, wherein the heat transfer member is a filter or a high-frequency coaxial connection line.

8. The antenna apparatus according to claim 1, wherein each of the plurality of slots is formed by intersecting a first opening extending in a first direction and a second opening extending in a second direction being different from the first direction.

9. The antenna apparatus according to claim 8, wherein both ends of the first opening and the second opening are widened.

10. The antenna apparatus according to claim 1, wherein the plurality of slots are sealed with a resin.

11. A radome having thermal conductivity, the radome comprising:
a planar portion configured to form a plurality of slots at positions facing each of a plurality of antenna elements and include a heat radiation fin protruding to an opposite side to a first surface side, in a state of covering a first substrate of which the plurality of antenna elements are disposed on the first surface; and
a wall portion configured to be provided between a first antenna element and a second antenna element being adjacent to the first antenna element among the plurality of antenna elements, and be capable of transferring heat of a heat generating component connected to the first substrate to the heat radiation fin.

12. The radome according to claim 11, wherein the heat radiation fin is disposed between a first slot and a second slot being adjacent to the first slot among the plurality of slots.

13. The radome according to claim 12, wherein the wall portion is provided at a position covering a first thermal via being formed on the first substrate in a state where the radome covers the first substrate, and is able to transfer heat of the heat generating component to the heat radiation fin via the first thermal via.

14. The radome according to claim 11, wherein each of the plurality of slots is formed by intersecting a first opening extending in a first direction and a second opening extending in a second direction being different from the first direction.

15. The radome according to claim 14, wherein both ends of the first opening and the second opening are widened.

16. The radome according to claim 11, wherein the plurality of slots are sealed with a resin.

* * * * *